United States Patent [19]

Szuminski et al.

[11] Patent Number: 4,713,935
[45] Date of Patent: Dec. 22, 1987

[54] VECTORABLE NOZZLES FOR AIRCRAFT

[75] Inventors: Gary F. Szuminski, Marietta; Douglas J. Nightingale, Jonesboro, both of Ga.

[73] Assignee: Rolls-Royce Inc., New York, N.Y.

[21] Appl. No.: 849,492

[22] Filed: Apr. 8, 1986

[51] Int. Cl.[4] .............................................. F02K 1/00
[52] U.S. Cl. ...................................... 60/229; 60/232; 60/263; 244/12.5; 244/23 D; 239/265.27; 239/265.35
[58] Field of Search ................ 60/232, 229, 228, 230, 60/263, 271, 262, 226.1; 244/12.5, 23 D, 12.4; 239/265.35, 265.41, 265.27, 265.25

[56] References Cited

U.S. PATENT DOCUMENTS

| 3,284,030 | 11/1966 | Madelung | 244/23 D |
|---|---|---|---|
| 3,357,645 | 12/1967 | Nash et al. | 60/232 |
| 3,528,247 | 9/1970 | Riemerschmid | 60/232 |
| 4,248,041 | 2/1981 | Wilde et al. | 244/23 D |
| 4,482,109 | 11/1984 | du Pont | 244/23 D |
| 4,519,543 | 5/1985 | Szuminski et al. | 60/228 |

FOREIGN PATENT DOCUMENTS

| 2037049 | 2/1972 | Fed. Rep. of Germany | 244/12.5 |
|---|---|---|---|
| 2832082 | 2/1979 | Fed. Rep. of Germany | 60/230 |
| 1554962 | 10/1979 | United Kingdom | 244/12.5 |

OTHER PUBLICATIONS

Lewis et al., "Supersonic VSTOL-Ready for Technology Push", *Aerospace America*, Oct. 1984, pp. 47-51.

Primary Examiner—Louis J. Casaregola
Assistant Examiner—Donald E. Stout
Attorney, Agent, or Firm—Cushman, Darby & Cushman

[57] ABSTRACT

One major problem associated with the design of high-speed vertical take-off or landing aircraft is the requirement to have the front vectorable nozzles of the aircraft deployed in the airstream which passes over the fuselage of the aircraft when they are in use. The nozzles tend to act as air brakes and thus seriously effect the forward speed and flight characteristics of the aircraft. This invention attempts to solve this problem by providing a vectorable nozzle which is rotatable about one axis between a first position in which it is stowed inside a cavity within the aircraft fuselage when not required, and a second position in which it is deployed into the airstream when required.

13 Claims, 12 Drawing Figures

VECTORABLE NOZZLES FOR AIRCRAFT

FIELD OF THE INVENTION

This invention relates to an improved vectorable nozzle of the type used in vertical take off or landing aircraft (VTOL). One such aircraft is, for example, the British Aerospace PLC Harrier. The present invention relates particularly to a nozzle for use with an engine and airframe configuration that requires that the nozzle may be stowed out of the airstream inside the aircraft's outer surface when it is not required.

STATEMENT OF PRIOR ART

The well known sub-sonic Harrier VTOL aircraft has two vectorable nozzles positioned in series on either side of its fuselage. The front two nozzles provide thrust by ejecting a portion of the airflow from a compressor of the aircraft engine to atmosphere and the rear two nozzles provide thrust by ejecting the entire airflow from the core-engine of the aircraft to atmosphere.

In operation, vertical lift is achieved by pointing all four nozzles downwards such that the thrust produced by the aircrafts engine is used to support the weight of the aircraft. In forward flight, all four nozzles are pointed rearwards such that the thrust acts to propel the aircraft forwards.

At supersonic speeds, the above described nozzles would seriously detract from the performance of the aircraft. The position of the nozzles would tend to make them act as air-brakes and thus seriously effect the forward speed and flight characteristics of the aircraft.

It is wellknown that the rear nozzles of the VTOL aircraft may be designed to overcome the drag effect at high speeds by for example, incorporating the nozzles into the contours of the aircraft fuselage such that they protrude from the rear of the aircraft rather than from the side. It is however extremely difficult to overcome the drag problem associated with the front nozzles since it is necessary that, in operation, the nozzles are situated outside the smooth contours of the aircraft's fuselage and in the airstream.

Further generations of VTOL aircraft will be required to fly at supersonic speeds. Such aircraft are likely to use a twin compressor (fan) engine in which the front compressor or fan is used to provide air to either the front vectorable nozzles or to the aft compressor or fan of a core engine.

During VTOL or low speed (subsonic) flight, it is desirable to operate the engine in a parallel flow mode whereby the engine's front fan airflow is discharged through the vectorable front nozzles, similar to that of the RR Pegasus ® engine. This offers the advantage of conveniently balancing the aircraft via the front nozzle thrust during VTOL operation. Parallel mode operations at low flight speeds also results in higher engine propulsive efficiencies due to the high volume of front fan air which bypasses (high bypass ratio) the core engine to be discharged through the front vectoring nozzles.

During high speed or supersonic flight, it is desirable to operate the engine in a series flow mode whereby the engine's front fan airflow is diverted, by means of a valve, from the front nozzles into the rear fan or core engine compressor. This produces a supercharging effect on the core engine which in turn increases the rear nozzle thrust to compensate for the loss in front nozzle thrust. Series mode operation at these higher aircraft speeds produces an increase in the engine's propulsive efficiency by reducing the amount of front fan flow which bypasses the core engine (low bypass ratio).

During the series mode operation, the front nozzles are no longer flowing and are thus unnecessary. It is therefore desirable to be able to retract or stow these nozzles in the aircraft's contour to reduce the drag which would result if they were to protrude into the airstream. The engine described above is essentially a "tandem-fan" engine that is to say that the compressor means comprises two compressors that operate either in the series flow mode or in a parallel flow mode as described above. However, it is to be understood that nozzles of the present invention can be used with any engine layout that incorporates a valve means which enables the flow to the nozzles to be interrupted to render the nozzles inoperable for stowage. The valve means need not be a change-over-flow valve as described above.

Figure 11:
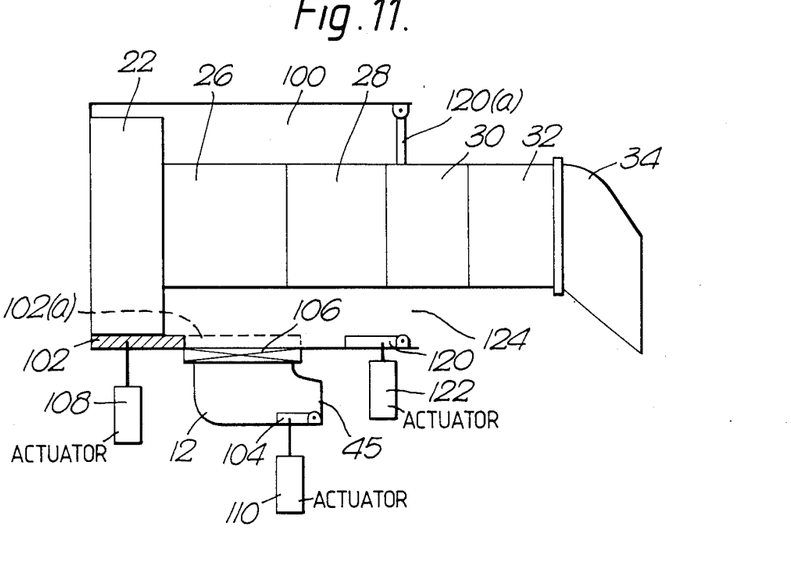
FIG. 11 is a schematic representation of an alternative engine layout which may incorporate the present invention.

FIG. 11 shows, schematically an alternative engine layout incorporating nozzles constructed and arranged in accordance with the present invention.

Aircraft of the type described above would benefit considerably from nozzles which may be moved out of the airstream during forward flight to reduce the drag effect.

STATEMENT OF INVENTION AND ADVANTAGES

It is an object of the present invention to provide a stowable vectorable nozzle in which the nozzle is rotatably mounted on the engine for rotation about an axis which is angled relative to a vertical plane (Z—Z FIG. 2) which is perpendicular to the engines center line and a horizontal plane (R—R FIG. 1) which passes through the centre line of the engine, and being constructed and arranged relative to its axis of rotation and to the engine so that when it is rendered inoperable by the valve means it can be rotated to a stowed position where it lies within the cavity and when it is rendered operable by the valve means it can be rotated to a deployed position where it lies outside the cavity.

BRIEF DESCRIPTION OF THE DRAWINGS

The present invention will now be more particularly described, by way of example only, with reference to the accompanying drawings, in which.

BEST MODE FOR CARRYING OUT THE INVENTION

Figure 1:
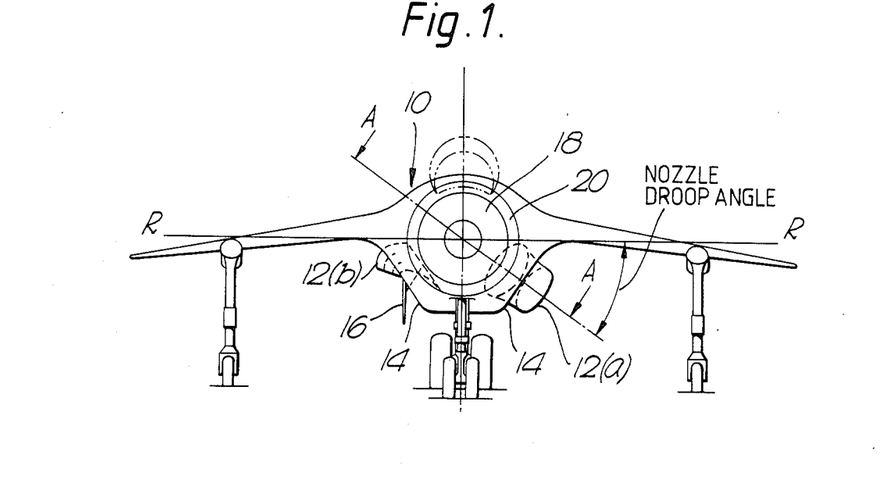
FIG. 1 is a front elevation of an aircraft having front vectorable nozzles constructed and arranged in accordance with the present invention.

Referring to FIG. 1, an aircraft 10 is provided with a vectorable nozzle 12 (a or b) on either side of its fuselage 14.

Nozzle 12(a) is shown in its deployed forward flight position, whilst nozzle 12(b) is shown in its vertical lift mode. A fairing door 16, described in detail below, is provided in the vicinity of each nozzle and acts to protect the fuselage 14 from the nozzle exit air. A main air intake 18 and an auxiliary intake 20 are provided to supply air to the first and second axial flow compressors (fans) of an engine shown schematically in FIG. 2.

Figure 2:
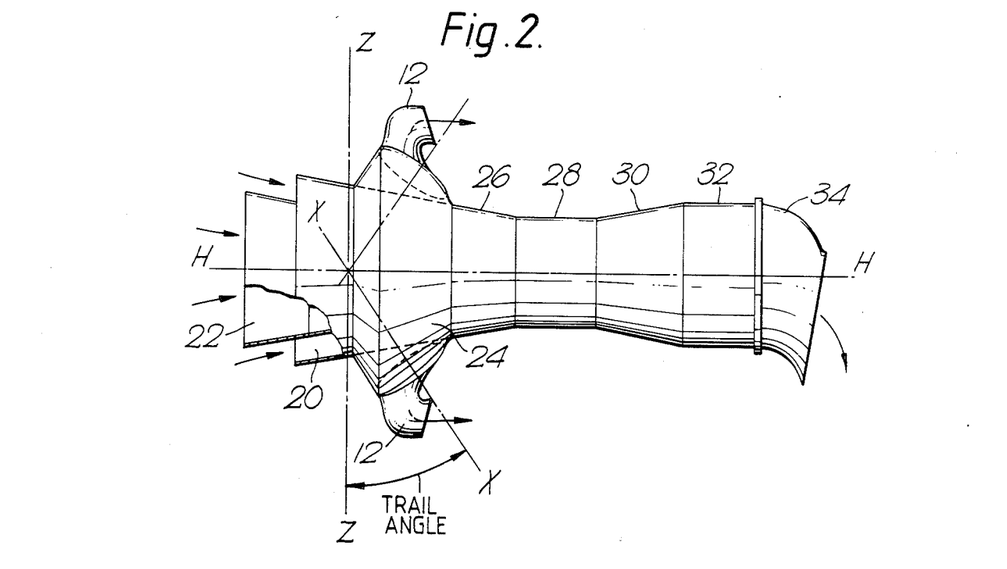
FIG. 2 is a plan view schematic representation of a twin-fan engine suitable for use in the present invention.

The engine shown in FIG. 2 comprises in flow series, a first axial flow compressor 22 (fan), a flow switchover valve 24, a second axial flow compressor 26 (fan), combustion means 28, turbine means 30 which drive the compressors 22, 26, a jet pipe 32 and a vectorable rear nozzle 34.

The engine has two modes of operation, namely series and parallel. In the series flow mode air from the first axial flow compressor 22 is directed into the second axial flow compressor 26 and acts to supercharge it. In the parallel mode, the switchover valve 24 is used to direct the air from the first axial flow compressor 22 to the vectorable front nozzles 12 (a,b). Air is supplied to the second axial flow compressor 26 via auxiliary air intake 20. Referring now to the drawings in general, but particularly to FIG. 3, the nozzle is mounted for rotation about axis x—x in a bearing 36 which in turn is mounted on the end of a plenum chamber 38. An actuator shown schematically at 40 is used to drive a gear 42 which acts on the outside diameter of the nozzle 44 to rotate the nozzle when desired. The plenum chamber 38 is positioned to receive air from the first axial flow compressor 22 via the switchover valve 24 when the engine is operating in the parallel mode.

The nozzle axis of rotation x—x is tilted relative to a vertical plane (Z—Z FIG. 2) which is perpendicular to the engines centerline and a horizontal plane (R—R FIG. 1) which passes through the centreline of the engine to provide trail and droop for efficient flow turning in both the vertical thrust and horizontal thrust modes of operation. The angles of droop and trail of the nozzles can be varied to suit the particular engine and aircraft installation.

Figure 3:
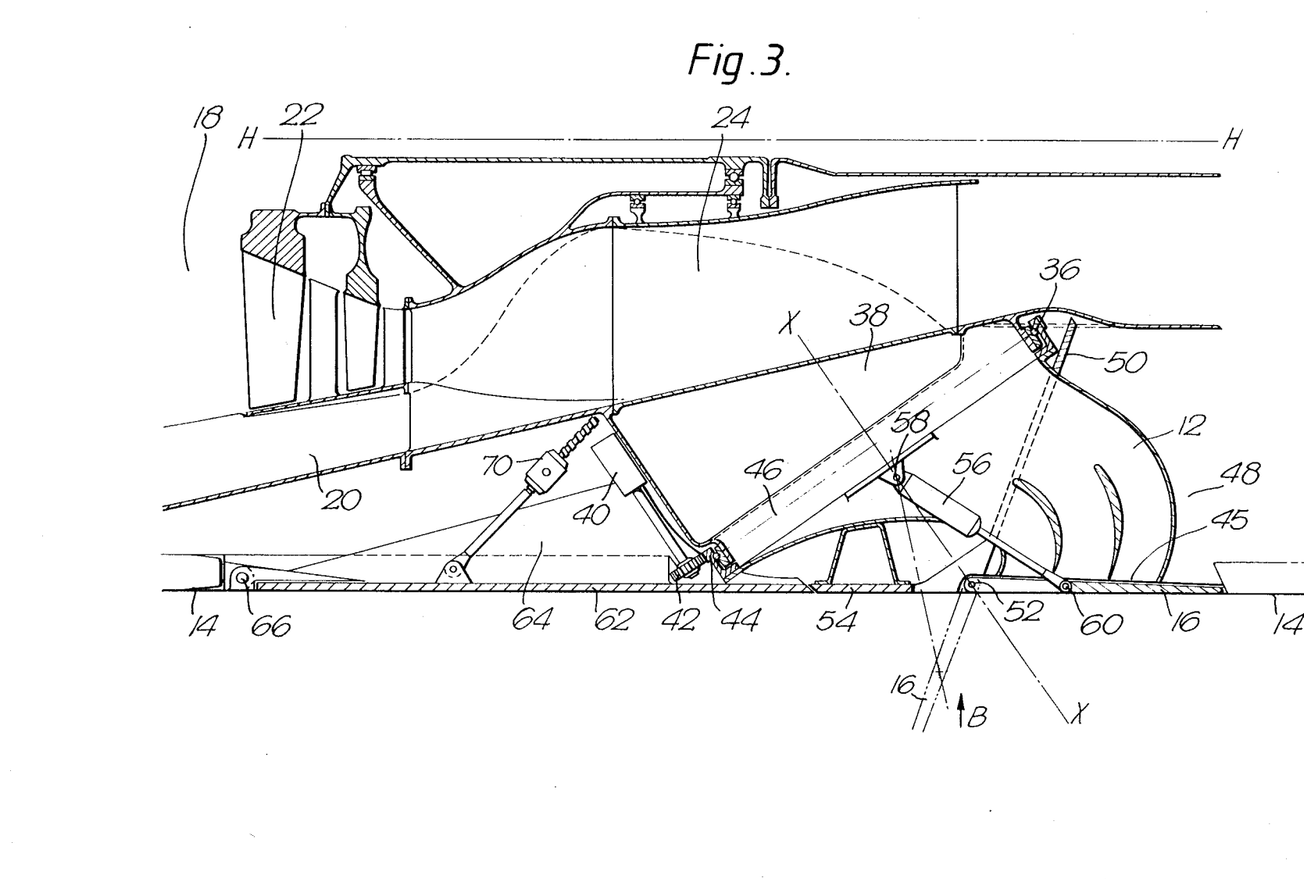
FIG. 3 is a cross-sectional view of a stowed front vectorable nozzle of the type shown in FIG. 1, taken in the direction of arrows A—A.
Figure 4:
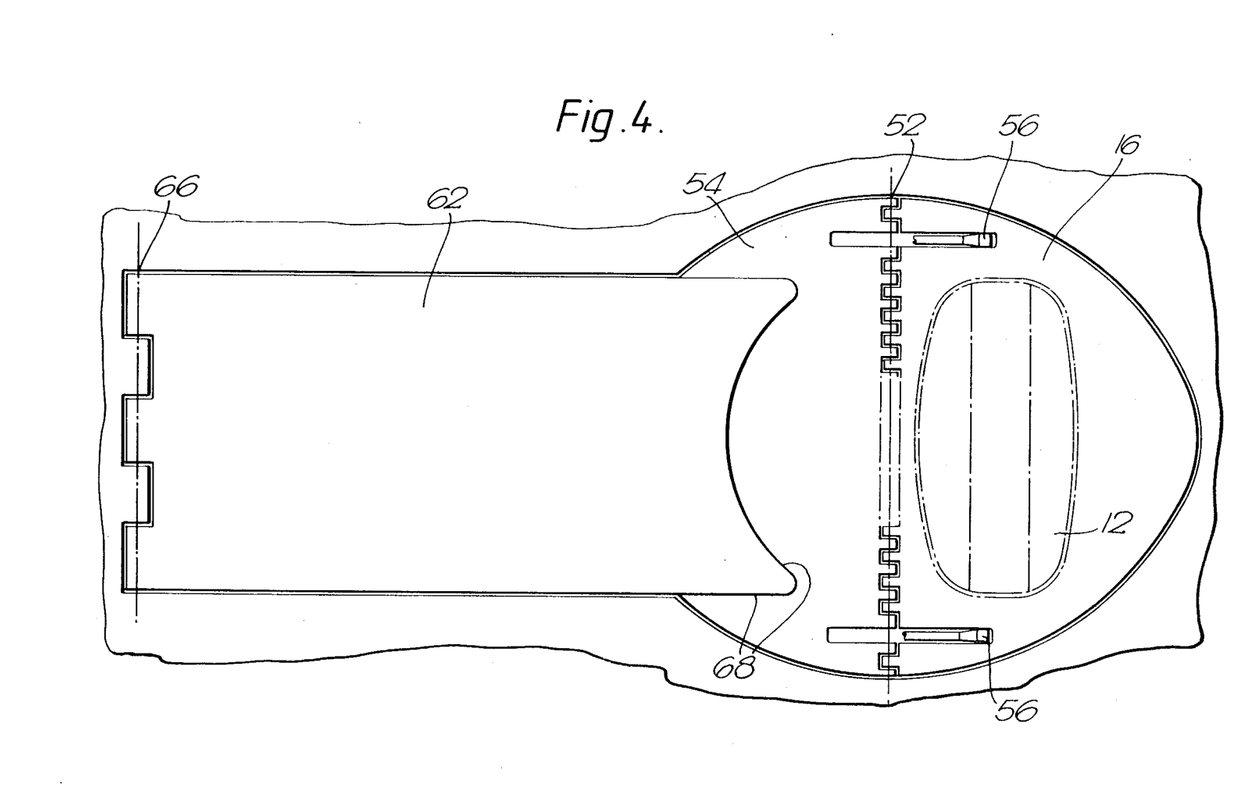
FIG. 4 is a side elevation of the sotwed nozzle shown in FIG. 3, taken in the direction of arrow B.
Figure 5:
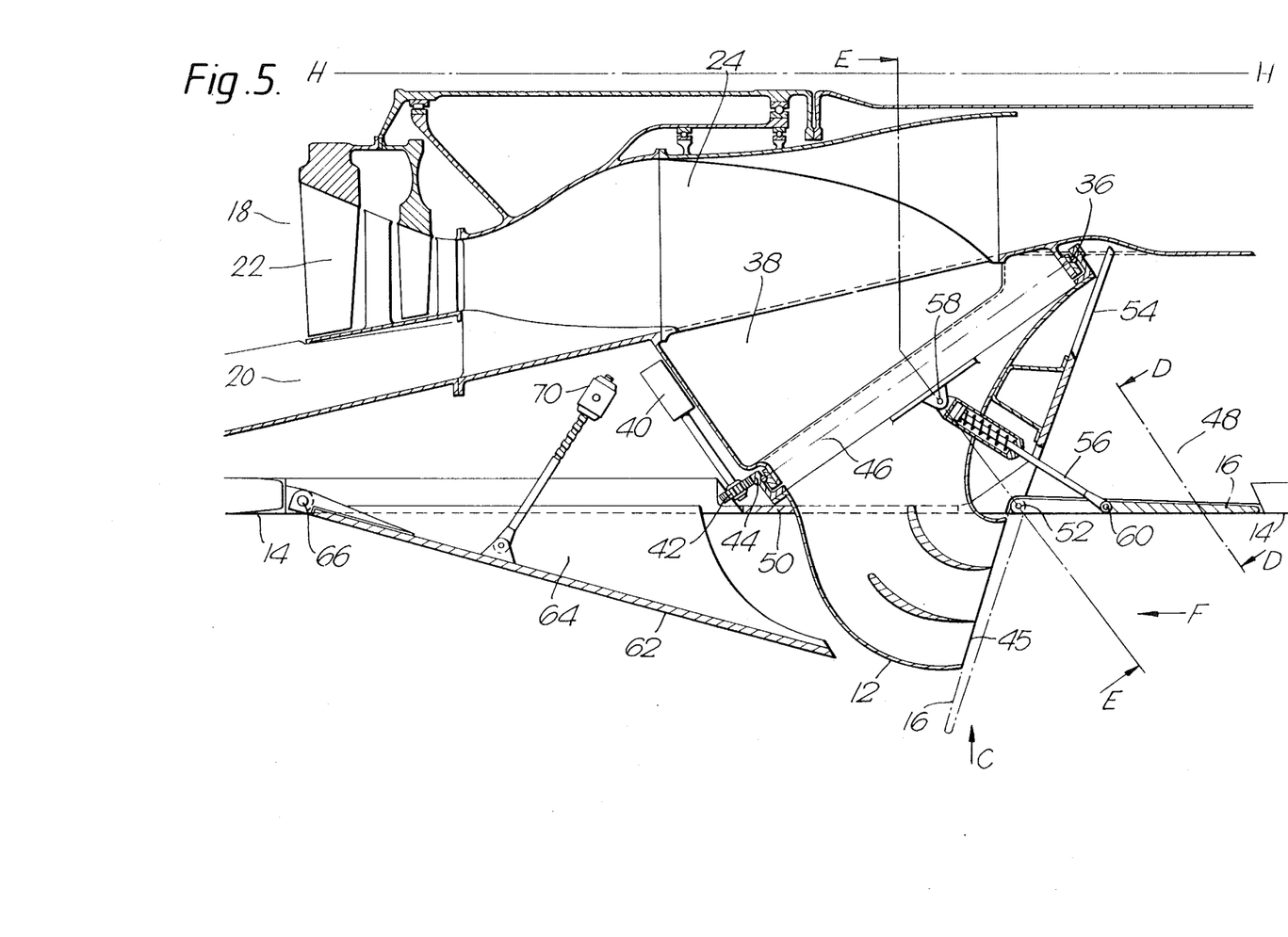
FIG. 5 is a cross-sectional view of the deployed front vectorable nozzle in the horizontal thrust position of the type shown in FIG. 1, taken in the direction of arrows A—A.
Figure 6:
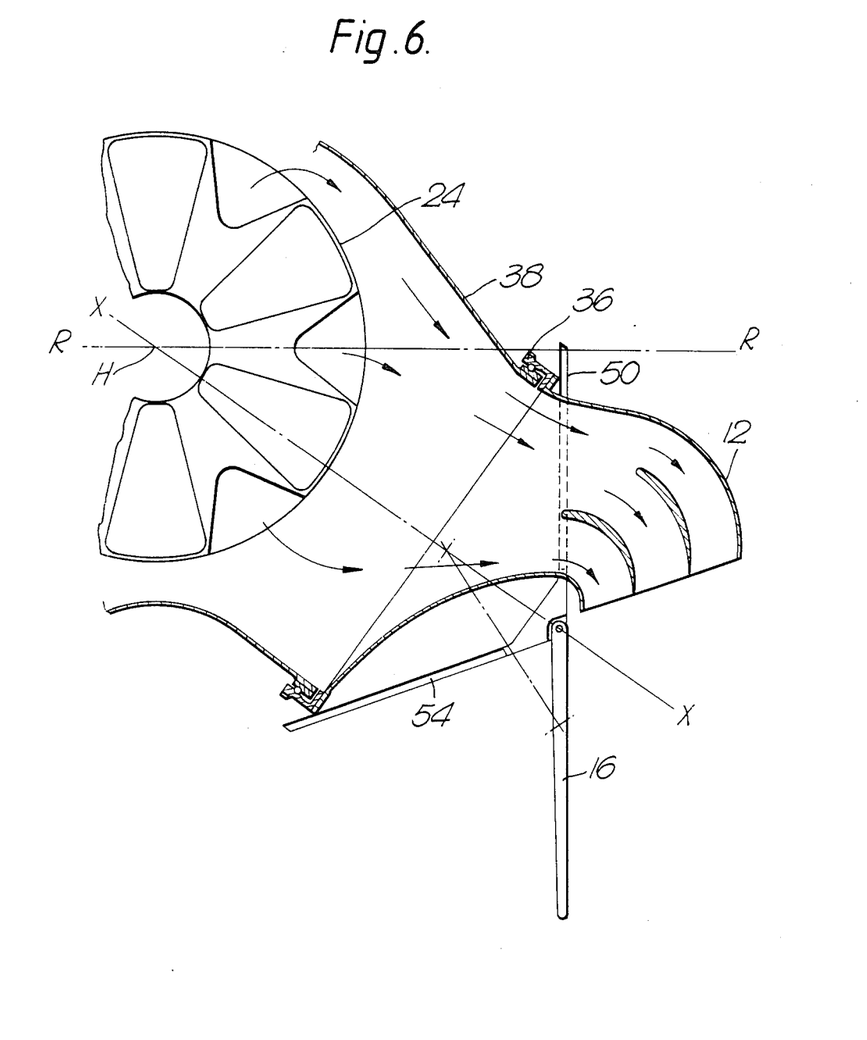
FIG. 6 is a cross-sectional view of the deployed nozzle in the vertical thrust position and diverter valve shown in FIG. 5, taken in the direction of arrows E—E.
Figure 7:
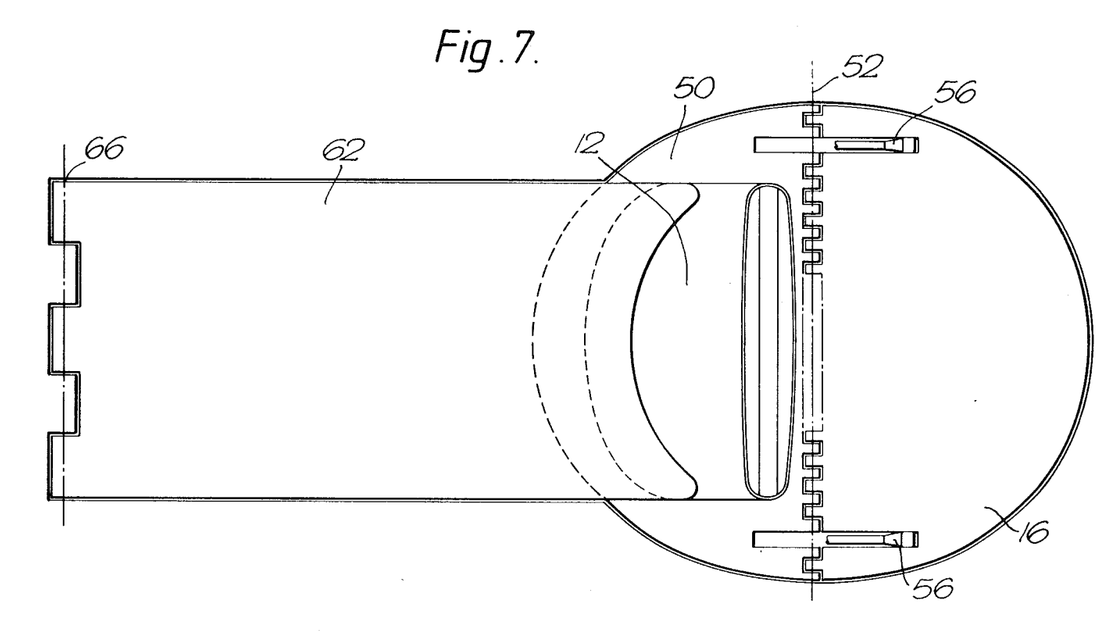
FIG. 7 is a side elevation of the deployed nozzle in the horizontal thrust position shown in FIG. 5, taken in the direction of arrow C.

The nozzles internal flow path, which takes the shape of a swan neck, lies within the bounds of an imaginary truncated cylinder or duct extending outward from the bearing plane 46. As the nozzle 12 is rotated 180° from the fully deployed horizontal thrust position (FIG. 5) the truncated shape, with the nozzle exit plane 45 shifted to one side of the bearing centre line, allows the nozzle 12 to stow neatly within the fuselage contour (FIG. 3). Alternatively, nozzle rotation about bearing axis X—X (FIG. 5) provides continuous thrust vectoring from the fully developed horizontal thrust position to the vertical thrust position. The actual angle through which the nozzle must be rotated to transition from horizontal to vertical thrust is a function of the nozzle's droop, trail, and splay angles. This can be greater than 90° depending on the angle chosen.

The eliptical fuselage cavity 48 (FIG. 8) required to clear the nozzle 12 during rotation is faired during both the deployed horizontal thrust and stowed nozzle positions. When the nozzle 12 is deployed an eliptically shaped cuff fairing 50, attached to the nozzle covers and fairs the forward portion of the fuselage cavity 48, the rear portion of the cavity 48 is then faired by the fairing door 16 which is hinged at point 52 to the cuff fairing 50.

Figure 8:
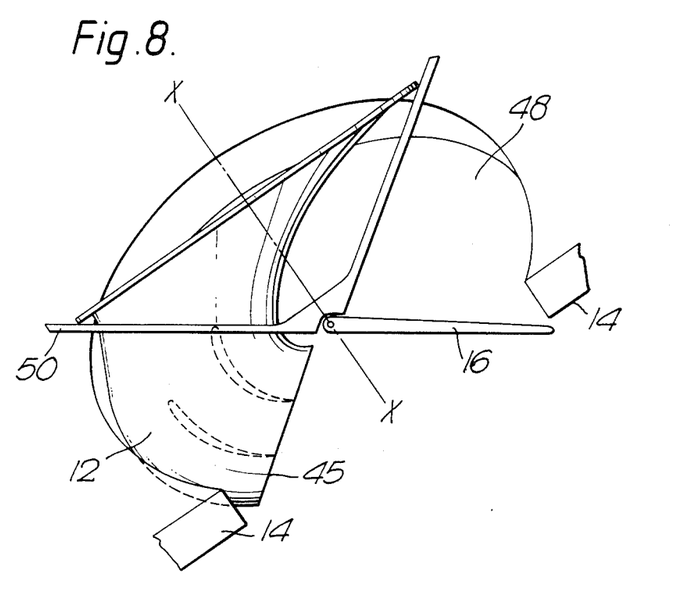
FIG. 8 is a cross-sectional view of the nozzle and fairing door in the vertical thrust position shown in FIG. 5, taken in the direction of arrows D—D.
Figure 9:
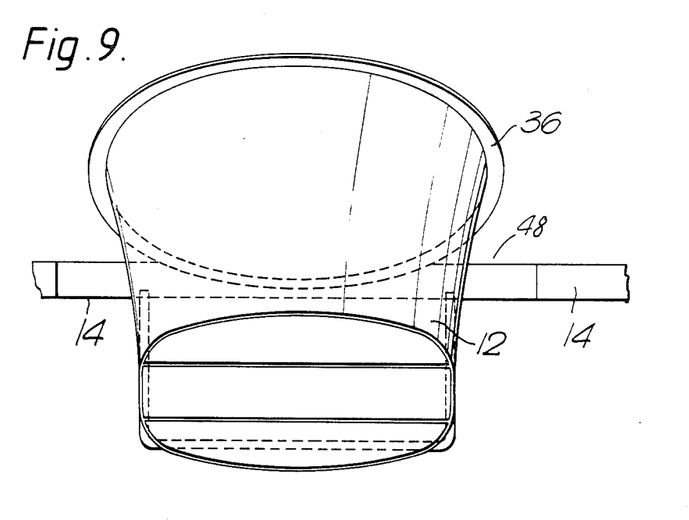
FIG. 9 is a view of the deployed nozzle in the horizontal thrust position shown in FIG. 5, taken in the direction of arrow F.

When the nozzle is in the stowed position, the forward portion of the fuselage cavity 48 is faired by the fuselage cavity fairing 54 which is an integral part of the cuff fairing 50. The rear portion of the cavity 48 is again faired by the fairing door 16.

During nozzle transition from the stowed to deployed position the fairing door 16 which rotates with the nozzle 12, covers the nozzle exit plane 45. As the nozzle reaches its fully deployed position and the diverter valve 24 moves to allow air from the first axial flow compressor 22 to enter the plenum chamber 38, compressor air pressure rotates the door aft, to cover and fair the rear portion of the fuselage cavity 48. A similar action occurs during nozzle transition from the deployed to the stowed mode. As the nozzle reaches its stowed position, the fairing door 16 protrudes into the free air stream. Assuming sufficient aircraft velocity, free stream pressure would then rotate the door 16 aft to again cover and fair the rear portion of the fuselage cavity 48. When the nozzle is in either the deployed or stowed condition, two over-centre spring loaded toggle struts 56 with integral damping means are incorporated to act as limit stops and restraint members to position and stabilise the door 16 in the event of nozzle efflux and/or engine bay pressure fluctuations. The struts 56 are attached to the nozzle 12 at point 58 on the bearing centre line x—x and at point 60 to the door 16.

A nozzle ramp fairing 62 is also incorporated to fair the external airflow around the nozzle 12 when deployed. This member is a simple ramp with side walls 64 hinged at its forward edge 66. During nozzle deployment the ramp 62 is first actuated to its fully deployed position, shown in FIG. 5, to clear the nozzle 12 and fairings 16, 50 and 54 structure during rotation. During nozzle stowage the ramp fairing 62 remains deployed until the nozzle 12 and fairings 16, 50 and 54 are fully stowed. Once stowed the ramp fairing 62 then retracts and nestles in a cut away portion 68 of the nozzle cavity fairing 54 to lie flush with the fuselage external surface 14. A ball screw actuator 70, or any other similar device is provided to move the ramp 62 between its stowed position and its deployed position.

It will be appreciated that the fairing door 16 may be replaced by any other suitable fairing means, such as for example a sleeve valve or a sliding plate which acts to cover and uncover the nozzle 12 when desired. Such a valve or plate may be situated downstream of the nozzle 12 and movable axially obturate the nozzle 12 or may be situated either above or below the nozzle 12 and movable circumferentially around the aircraft's fuselage to obturate the nozzle 12.

It will also be appreciated that the front nozzle 12 may be activated whilst in their stowed position to provide some reverse thrust or thrust spoilage during an aircraft roll out manoeuvre or even during high speed forward flight.

Figure 10:
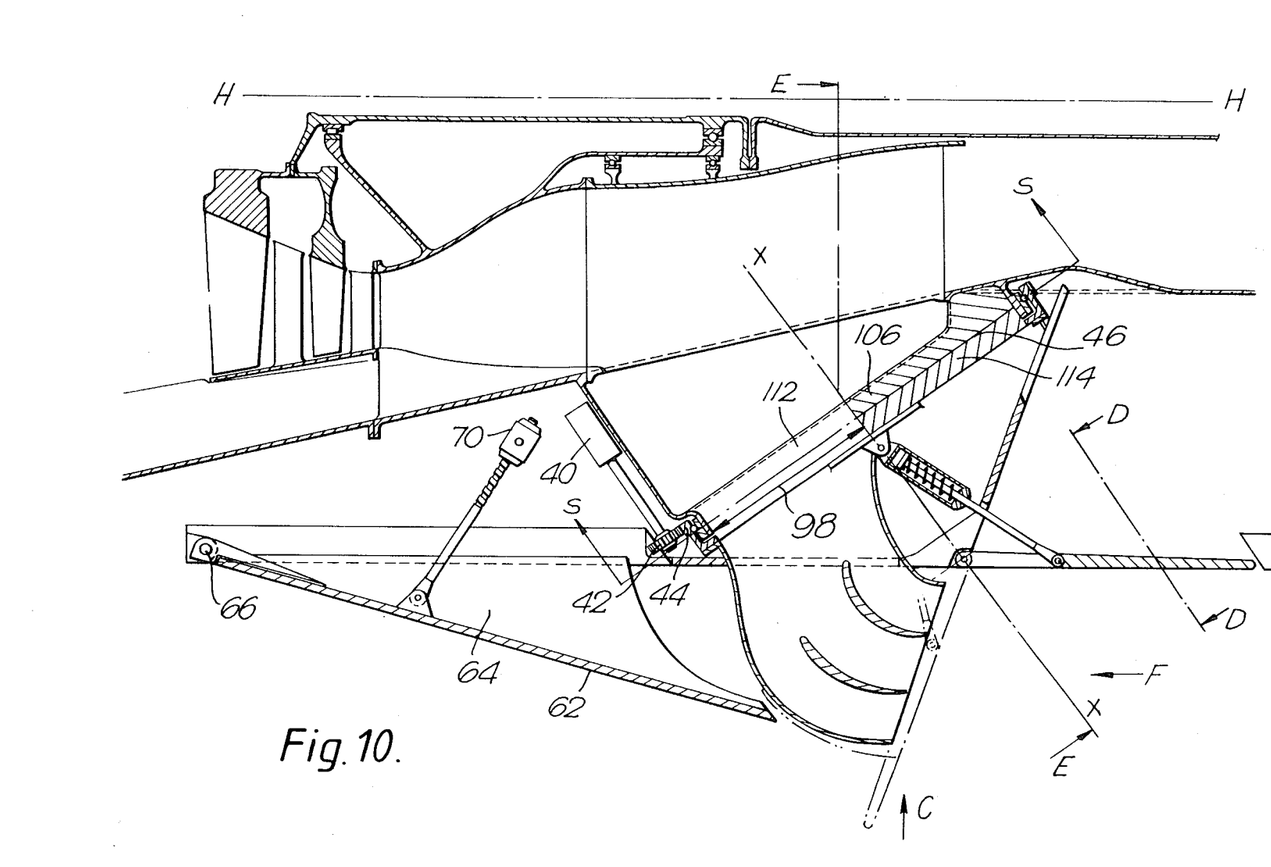
FIG. 10 is a cross-sectional view of a deployed nozzle in the horizontal thrust position having a slightly different entrance area to that shown in FIG. 5.
Figure 12:
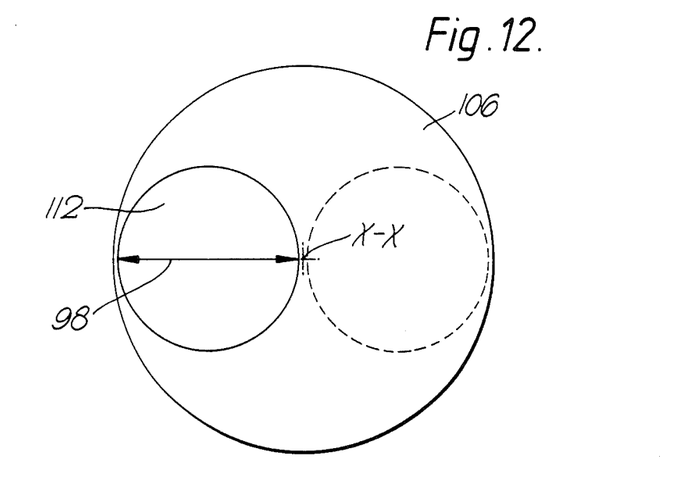
FIG. 12 is a cross-sectional view of the valve means shown in FIG. 10, taken in the direction of arrows S—S.

Referring now to FIG. 10, it will be appreciated that the entrance area of the nozzle shown at 98 may be altered such that it lies to one side of the nozzle axis of rotation X—X. This arrangement may be used with a plate valve which obturates the nozzle in its stowed position and uncovers the nozzle in its deployed position, such a plate valve is shown in fig 12 and described in detail below. Referring to FIG. 11 and alternative layout of engine is illustrated and comprises a first compressor 22 and a second compressor 26, combustion means 28, turbine means 30, a jet pipe 32, a vectorable rear nozzle 34 and a by-pass duct 100. Three alternative methods of obturating the front vectorable nozzles are shown at 102, 104 and 106. The first means 102, comprises a sleeve or plate which is moved across the entrance of the nozzle 12 by an actuator 108 when it is desired to prevent air from the first axial flow compressor 22 entering the nozzle 12 and removed from the entrance of the nozzle 12 when it is desired to allow air to enter the nozzle 12. The second comprises a flap (or other such similar device) 104 which is situated at the exit plane 45 of the nozzle 12 and is actuated by actuator 110 to obturate or uncover the nozzle exit area as and when desired. The third comprises an obturator plate 106 for use with a nozzle shown in FIG. 10. The plate 106 is situated across the bearing plane 46 and has a hole 112 (best seen in FIG. 12) situated on the upstream side of the axis of rotation X—X which communicates with the nozzle 12 in its deployed position to supply compressor air to the nozzle but which is obturated by a blanking portion of the nozzle 114 (FIG. 10) in the nozzles stowed position (shown dotted in FIG. 12) such that no compressor air enters the nozzle 12.

The engine is further provided with a means for obturating the by-pass duct 100 which are shown schematically as flaps 120. The flaps 120 are actuated by actuator 122 to move them to and from a first position in which they uncover the outlet 124 of the by-pass duct 100 and to and from a second position 102(a) in which they act to obturate the duct 100.

Two modes of engine operation are possible. In the first mode, the nozzle 12 is obturated by either means 102, 104, or 106 and the by-pass duct left uncovered by the obturator means 120 such that a portion of air from the first axial flow compressor exits to atmoshpere from the by-pass duct 100 and the engine acts as a by-pass engine. In the second mode, the by-pass duct 100 is obturated and the nozzle is unobturated by means 102, 104, or 106 such that a portion of air from the first axial flow compressor is vented to atmosphere via the nozzle 12.

We claim:

1. A gas turbine engine for installation in an aircraft fuselage which includes a storage cavity, the engine comprising:
    a compressor means;
    a first vectorable nozzle having an exit area and being positioned to receive air compressed by the compressor means;
    a valve means which in a first position interrupts the flow of compressed air from the compressor means and thereby renders the nozzle inoperable, and in a second position allows air from the compressor means to flow to the nozzle and thereby render the nozzle operable;
    combustion means connected for receiving air from the compressor means;
    turbine means positioned to receive gases from the combustion means and connected to drive the compressor means;
    and a second vectorable nozzle positioned to receive and direct gases from the turbine means;
    means for mounting said first nozzle for rotation about an axis which is angled relative to a first plane which is perpendicular to the longitudinal centerline of said engine and having said exit area offset from said axis of rotation;
    means for rotating said mounting means to move said nozzle between a stowed position within said cavity wherein said valve means is in said first position and an operating position outside said cavity wherein said valve means is in said second position;
    said engine further including a fairing means provided to cover the fuselage cavity in both the deployed and the stowed positions of said first nozzle;
    said fairing means comprising a first portion fixed relative to the nozzle which acts to fair the forward end of the cavity when the nozzle is in the fully deployed or stowed position, and a movable second portion which acts to fair the rear portion of the cavity in both the deployed and stowed positions of the first nozzle.

2. An engine according to claim 1 in which the axis of rotation of the first nozzle is also angled relative to a second plane which passes through the centre line of the engine.

3. An engine according to claim 1 wherein the compressor means comprises a first compressor and a second compressor in flow series, the valve means is located between the first and second compressors, and the first nozzle communicates with a region located between the first and second compressors, said valve means being operable so that in the first position of the valve means air from the first compressor is directed into the second compressor and in a second position of the valve means air from the first compressor is supplied to the first nozzle.

4. An engine according to claim 3 in which an auxiliary air intake is provided to supply air to the second compressor when the valve means is in its second position.

5. An engine according to claim 1 wherein the compressor means comprises a first compressor and a second compressor in flow series, the first nozzle communicates with a region located between the first and second compressors, and the valve means is loacted at an inlet to the first nozzle and is operable when the nozzle is in the stowed position to obturate the flow through the first nozzle and when the nozzle is in the deployed position is operable to allow air to flow through the first nozzle.

6. An engine according to claim 5 wherein the valve means is provided at, or adjacent to, the plane of a bearing in which the first nozzle is mounted for rotation.

7. An engine according to claim 1 wherein the compressor means comprises a first compressor and a second compressor in flow series, the first nozzle communicates with a region located between the first and second compressors, and the valve means is located at an outlet from the first nozzle and is operabale when the nozzle is in the stowed position to obturate the flow through the first nozzle and when the nozzle is in the deployed position is operable to allow air to flow through the first nozzle.

8. An engine according to claim 1 wherein the compressor means comprises a first compressor and a second compressor in series, the first compressor supplies air to the second compressor and to a by-pass duct, the first nozzle communicates with an outlet opening in a wall of the by-pass duct, the valve means is provided at the outlet opening in the wall of the by-pass duct, and obturator means is provided for closing off the by pass duct when the first nozzle is rendered operable by the valve means.

9. An engine according to claim 1 in which the angle at which the axis of rotation is positioned relative to the engines said vertical and horizontal planes are both substantially the same angle.

10. An engine according to claim 1 in which the first nozzle is operable when in its stowed position to provide reverse thrust or thrust spoilage.

11. A gas turbine engine for installation in an aircraft fuselage which includes a storage cavity, the engine comprising:
   a compressor means;
   a first vectorable nozzle having an exit area and being positioned to receive air compressed by the compressor means;
   a valve means which in a first position interrupts the flow of compressed air from the compressor means and thereby renders the nozzle inoperable, and in a second position allows air from the compressor means to flow to the nozzle and thereby render the nozzle operable;
   combustion means connected for receiving air from the compressor means;
   turbine means positioned to receive gases from the combustion means and connected to drive the compressor means;
   and a second vectorable nozzle positioned to receive and direct gases from the turbine means;
   means for mounting said first nozzle for rotation about an axis which is angled relative to a first plane which is perpendicular to the longitudinal centerline of said engine and having said exit area offset from said axis of rotation;
   means for rotating said mounting means to move said nozzle between a stowed position within said cavity wherein said valve means is in said first position and an operating position outside said cavity wherein said valve means is in said second position;
   said engine including fairing means provided to cover the fuselage cavity in both the deployed and the stowed positions of said first nozzle;
   said fairing means comprising a first portion and a movable second portion, said movable second portion comprising a door, hinged at the downstream edge of the nozzle nearest the axis of rotation means which is provided with a means for controlling the angle of movement of the door.

12. An engine according to claim 11 in which the fairing means further comprises a movable ramp situated forward of the nozzle which acts to fair the forward edge of the nozzle when the nozzle is in the deployed position.

13. An engine according to claim 11 in which the movable second portion comprises a slidable plate situated adjacent to the rear portion of the cavity.

* * * * *